United States Patent
Ohki

(10) Patent No.: US 8,002,907 B2
(45) Date of Patent: Aug. 23, 2011

(54) BEARING'S COMPONENT, HEAT TREATMENT METHOD THEREOF, HEAT TREATMENT APPARATUS, AND ROLLING BEARING

(75) Inventor: Chikara Ohki, Kuwana (JP)

(73) Assignee: NTN Corporation, Osaka (JP)

( * ) Notice: Subject to any disclaimer, the term of this patent is extended or adjusted under 35 U.S.C. 154(b) by 1462 days.

(21) Appl. No.: 10/897,016

(22) Filed: Jul. 23, 2004

(65) Prior Publication Data

US 2005/0045247 A1    Mar. 3, 2005

(30) Foreign Application Priority Data

Aug. 29, 2003   (JP) ................................ 2003-307281

(51) Int. Cl.
*C23C 8/32* (2006.01)
(52) U.S. Cl. ....................................... 148/318; 148/218
(58) Field of Classification Search .................. 148/318, 148/218
See application file for complete search history.

(56) References Cited

U.S. PATENT DOCUMENTS

| | | | |
|---|---|---|---|
| 3,954,517 A | 5/1976 | Jatczak et al. | |
| 4,162,419 A | 7/1979 | DeAngelis | |
| 4,930,909 A * | 6/1990 | Murakami et al. | 384/492 |
| 4,971,634 A | 11/1990 | Shibata et al. | |
| 5,085,733 A | 2/1992 | Mitamura | |
| 5,129,966 A | 7/1992 | Rao | |
| 5,137,375 A | 8/1992 | Murakami et al. | |
| 5,180,450 A | 1/1993 | Rao | |
| 5,338,377 A | 8/1994 | Mitamura et al. | |
| 5,352,303 A | 10/1994 | Murakami et al. | |
| 5,375,323 A | 12/1994 | Sata | |
| 5,413,643 A * | 5/1995 | Murakami et al. | 148/319 |
| 5,427,457 A | 6/1995 | Furumura et al. | |
| 5,427,600 A | 6/1995 | Itoh et al. | |
| 5,456,136 A | 10/1995 | Yamashita et al. | |
| 5,456,766 A | 10/1995 | Beswick | |
| 5,595,610 A | 1/1997 | Maeda et al. | |
| 5,611,250 A | 3/1997 | Narai et al. | |
| 5,658,082 A | 8/1997 | Tsushima et al. | |
| 5,733,667 A | 3/1998 | Nakasuji et al. | |
| 5,772,956 A | 6/1998 | Hasegawa et al. | |

(Continued)

FOREIGN PATENT DOCUMENTS

CN          1344932 A     4/2002

(Continued)

OTHER PUBLICATIONS

Chinese Office Action issued in Chinese Patent Application No. CN 200410076973X, dated Jun. 8, 2007.

(Continued)

*Primary Examiner* — Jessee R. Roe
(74) *Attorney, Agent, or Firm* — McDermott Will & Emery LLP

(57) ABSTRACT

Obtain a bearing's component, a heat treatment method thereof, and a rolling bearing having a long life against rolling contact fatigue and high anti-crack strength, and suppressed long-term dimensional variation rate. The bearing's component is carbonitrided at a carbonitriding temperature higher than an $A_1$ transformation point of steel for the bearing's component and then cooled to a temperature lower than the $A_1$ transformation point, and subsequently, using a heat treatment apparatus that successively moves and heats each individual bearing's component, reheated to a range of quenching temperature of no less than the $A_1$ transformation point and less than the carbonitriding temperature to be quenched.

8 Claims, 9 Drawing Sheets

U.S. PATENT DOCUMENTS

| | | | |
|---|---|---|---|
| 5,775,280 | A | 7/1998 | Schmidt et al. |
| 5,792,286 | A | 8/1998 | Inoue et al. |
| 5,803,993 | A | 9/1998 | Yoshida et al. |
| 5,848,846 | A | 12/1998 | Sugiyama et al. |
| 5,853,249 | A | 12/1998 | Maeda et al. |
| 5,944,916 | A | 8/1999 | Chung |
| 5,972,130 | A | 10/1999 | Underys et al. |
| 5,979,383 | A | 11/1999 | Faville et al. |
| 6,012,851 | A | 1/2000 | Hirakawa et al. |
| 6,086,686 | A | 7/2000 | Tanaka et al. |
| 6,095,692 | A | 8/2000 | Takemura |
| 6,149,734 | A | 11/2000 | Isogai et al. |
| 6,158,263 | A | 12/2000 | Maeda et al. |
| 6,165,289 | A | 12/2000 | Matsumoto et al. |
| 6,224,688 | B1 | 5/2001 | Takemura et al. |
| 6,251,198 | B1 | 6/2001 | Koo et al. |
| 6,258,179 | B1 | 7/2001 | Takayama et al. |
| 6,290,398 | B1 | 9/2001 | Fujiwara et al. |
| 6,306,227 | B2 | 10/2001 | Okayama et al. |
| 6,309,475 | B1 | 10/2001 | Takayama et al. |
| 6,328,009 | B1 | 12/2001 | Brothers |
| 6,342,109 | B1 | 1/2002 | Takemura et al. |
| 6,423,158 | B1 | 7/2002 | Maeda et al. |
| 6,440,232 | B1 | 8/2002 | Takemura et al. |
| 6,447,619 | B1 | 9/2002 | Takayama et al. |
| 6,488,789 | B2 | 12/2002 | Tajima et al. |
| 6,532,920 | B1 | 3/2003 | Sweetnam et al. |
| 6,582,532 | B1 | 6/2003 | Kurebayashi et al. |
| 6,602,358 | B1 | 8/2003 | Ochi et al. |
| 6,641,680 | B2 | 11/2003 | Nishimori et al. |
| 6,699,335 | B2 | 3/2004 | Murakami et al. |
| 6,855,217 | B2 | 2/2005 | Suzuki |
| 7,147,382 | B2 | 12/2006 | Suzuki et al. |
| 2002/0043111 | A1 | 4/2002 | Takagi et al. |
| 2002/0082133 | A1 | 6/2002 | Yoshikawa et al. |
| 2002/0088511 | A1 | 7/2002 | Nakamura et al. |
| 2002/0159905 | A1 | 10/2002 | Bachmann et al. |
| 2003/0037635 | A1 | 2/2003 | Tsuchiyama et al. |
| 2003/0040401 | A1 | 2/2003 | Okita et al. |
| 2003/0063829 | A1 | 4/2003 | Tamada et al. |
| 2003/0075244 | A1 | 4/2003 | Kurebayashi et al. |
| 2003/0123769 | A1 | 7/2003 | Ohki |
| 2004/0079310 | A1 | 4/2004 | Suzuki et al. |
| 2004/0170348 | A1 | 9/2004 | Okugami et al. |
| 2004/0170761 | A1 | 9/2004 | Li et al. |
| 2004/0179761 | A1 | 9/2004 | Ohki et al. |
| 2004/0228561 | A1 | 11/2004 | Okugami et al. |
| 2005/0045247 | A1 | 3/2005 | Ohki |
| 2005/0109308 | A1 | 5/2005 | Suzuki et al. |
| 2005/0205163 | A1 | 9/2005 | Ohki |
| 2007/0034301 | A1 | 2/2007 | Hasegawa et al. |
| 2007/0151633 | A1 | 7/2007 | Ohki et al. |
| 2007/0169850 | A1 | 7/2007 | Ohki et al. |

FOREIGN PATENT DOCUMENTS

| | | | |
|---|---|---|---|
| CN | 1351694 A | | 5/2002 |
| CN | 1421541 A | | 6/2003 |
| DE | 42 04 982 A1 | | 8/1993 |
| DE | 199 60 803 A1 | | 6/2000 |
| DE | 102 54 635 A1 | | 6/2003 |
| EP | 0 458 646 | | 11/1991 |
| EP | 0 600 421 | | 6/1994 |
| EP | 0 626 468 A1 | | 11/1994 |
| EP | 0 723 034 A2 | | 7/1996 |
| EP | 0 811 789 A1 | | 12/1997 |
| EP | 0 950 723 A1 | | 10/1999 |
| EP | 1 070 760 A2 | | 1/2001 |
| EP | 1 158 064 A1 | | 11/2001 |
| EP | 1 273 672 A1 | | 1/2003 |
| EP | 1 411 142 A1 | | 4/2004 |
| FR | 2 841 907 | | 1/2004 |
| GB | 2 258 274 A | | 2/1993 |
| JP | 48-28308 | | 4/1973 |
| JP | 63-185917 | | 11/1988 |
| JP | 02-125841 A | | 5/1990 |
| JP | 02-190615 | | 7/1990 |
| JP | 03-116706 | | 12/1991 |
| JP | 04-254574 | | 9/1992 |
| JP | 5-9584 | | 1/1993 |
| JP | 05-118336 | | 5/1993 |
| JP | 05-163563 A | | 6/1993 |
| JP | 05-179350 | | 7/1993 |
| JP | 05-263091 | | 10/1993 |
| JP | 6-101424 | | 4/1994 |
| JP | 06-117438 | | 4/1994 |
| JP | 06-247253 | | 9/1994 |
| JP | 06-286577 | | 10/1994 |
| JP | 06-341441 | | 12/1994 |
| JP | 07-027139 | | 1/1995 |
| JP | 8-4774 | | 1/1996 |
| JP | 08-049057 | | 2/1996 |
| JP | 08-233070 | | 9/1996 |
| JP | 08-311603 | | 11/1996 |
| JP | 09-053148 | | 2/1997 |
| JP | 09-176740 | | 7/1997 |
| JP | 09-316601 | | 12/1997 |
| JP | 09-329139 | | 12/1997 |
| JP | 10-030150 | | 2/1998 |
| JP | 10-047334 | | 2/1998 |
| JP | 10-068419 | | 3/1998 |
| JP | 10-103339 | | 4/1998 |
| JP | 10-110720 | | 4/1998 |
| JP | 10-168515 | | 6/1998 |
| JP | 10-184701 | | 7/1998 |
| JP | 10-204612 | | 8/1998 |
| JP | 10-231908 | | 9/1998 |
| JP | 11-080897 | | 3/1999 |
| JP | 11-101247 | | 4/1999 |
| JP | 11-140543 | | 5/1999 |
| JP | 11-222627 | | 8/1999 |
| JP | 11-303874 | | 11/1999 |
| JP | 2000-018255 | | 1/2000 |
| JP | 2000-038906 | | 2/2000 |
| JP | 2000-038907 | | 2/2000 |
| JP | 2000-54810 | | 2/2000 |
| JP | 2000-129347 | | 5/2000 |
| JP | 2000-205284 | | 7/2000 |
| JP | 2000-212721 | | 8/2000 |
| JP | 2001-123244 | | 5/2001 |
| JP | 2001-200314 | | 7/2001 |
| JP | 2002-031212 | | 1/2002 |
| JP | 2002-070872 | | 3/2002 |
| JP | 2002-120508 | | 4/2002 |
| JP | 2002-180203 | | 6/2002 |
| JP | 2002-194438 | | 7/2002 |
| JP | 2002-256336 | | 9/2002 |
| JP | 2002-339054 | | 11/2002 |
| JP | 2003-56315 | | 2/2003 |
| JP | 2003-083337 | | 3/2003 |
| JP | 2003-083339 | | 3/2003 |
| JP | 2003-156050 | | 5/2003 |
| JP | 2003-226918 | | 8/2003 |
| JP | 2003-226919 | | 8/2003 |
| JP | 2003-287035 | | 10/2003 |
| JP | 2003-294034 | | 10/2003 |
| JP | 2003-294038 | | 10/2003 |
| WO | WO 91/00929 | | 1/1991 |
| WO | WO 02/40730 A1 | | 5/2002 |

OTHER PUBLICATIONS

Japanese Office Action, with English translation, Japanese Patent Application No. JP 2003-307281, mailed Sep. 25, 2007.

Japanese Office Action, with English Translation, issued in Japanese Patent Application No. 2002-194775, dated on Mar. 22, 2006.

Japanese Office Action, with English Translation, issued in Japanese Patent Application No. 2002-194793, dated on Mar. 22, 2006.

Japanese Office Action, with English Translation, issued in Japanese Patent Application No. 2002-194804, dated on Mar. 20, 2007.

Japanese Office Action, with English Translation, issued in Japanese Patent Application No. 2002-194804, dated on Nov. 28, 2006.

Japanese Office Action, with English Translation, issued in Japanese Patent Application No. 2002-194921, dated on Nov. 28, 2006.

Japanese Office Action, with English Translation, issued in Japanese Patent Application No. 2002-303036, dated on Apr. 25, 2006.

Japanese Office Action, with English Translation Issued in Japanese Patent Application No. 2002-303036, dated on Oct. 24, 2006.
Japanese Office Action, with English Translation, issued in Japanese Patent Application No. 2003-209737, dated on Feb. 6, 2007.
Japanese Office Action, with English Translation, issued in Japanese Patent Application No. 2002-194804, dated on Mar. 20, 2007.
European Search Report, issued in European Patent Application No. 05703409.2-2424, dated on Apr. 4, 2007.
Chinese Office Action, with English Translation, issued in Chinese Patent Application No. 200410008248.9, dated on Apr. 27, 2007.
Annual book of ASTM Standards Section Three Metals Test Methods and Analytical Procedures, 2003, vol. 03.01, ASTM, International Standards Worldwide.
JIS G 0551 "Methods of austenite grain size determination for steel", Published by Japanese Standards Association, Feb. 20, 1998.
JIS Z 2242 "Method of impact test for metallic materials", Published by Japanese Standards Association, Dec. 21, 1998.
JIS Z 2202 "Test pieces for impact test for metallic materials" Published by Japanese Standards Association, Feb. 20, 1998.
Burrier, Jr., H., "Hardenability of Carbon and Low-Alloy Steels", 2002, ASM International.
Vander Voort, G., "Embrittlement of Steels", 2002 ASM International.
Kim, C., et al., "Influence of Subzero and Shot-Peening Treatments on Impact and Fatigue Fracture Properties of Case-Hardened Steels", J. Heat Treat., Jun. 1981, pp. 43-53, vol. 2 No. 1.
US Office Action, issued in U.S. Appl. No. 10/686,766, dated on Nov. 7, 2007.
US Office Action, issued in U.S. Appl. No. 10/787,221, dated on Oct. 26, 2007.
U.S. Appl. No. 10/585,646, filed on Jul. 7, 2006.

Japanese Office Action, with English translation, issued in Japanese Patent Application No. JP 2004-053995 dated on Jun. 17, 2008.
European Search Report issued in European Patent Application No. EP 04807374.6 dated Dec. 18, 2008.
U.S. Office Action issued in U.S. Appl. No. 10/585,646 dated Jan. 16, 2009.
Chinese Office Action, w/ English translation thereof, issued in Chinese Patent Application No. CN 200710146997.1 dated Dec. 26, 2008.
Chinese Office Action, with English translation, issued in Chinese Patent Application No. 200710146996.7, dated Feb. 6, 2009.
Chinese Office Action, with English translation, issued in Chinese Patent Application No. CN 200610004620.8, mailed Sep. 5, 2008.
"Technical Means for Improvement of Service Life of a Rolling Bearing", Bearing, 2001, pp. 1,2,5 and 45, No. 5, and partial English translation.
Metallic Material Refining Technology, May 1995, p. 47, and partial English translation.
Japanese Notice of Grounds of Rejection, w/ English translation thereof, issued in Japanese Patent Application No. JP 2006-139254 dated May 26, 2009.
United States Office Action issued in U.S. Appl. No. 10/787,221 dated Jul. 9, 2009.
United States Office Action issued in U.S. Appl. No. 10/795,389 dated Jul. 29, 2009.
United States Office Action issued in U.S. Appl. No. 11/501,816 dated Aug. 11, 2009.
Japanese Office Action, with English translation, issued in Japanese Patent Application No. 2004-024096, mailed Jan. 19, 2010.

* cited by examiner

1°C/MIN 2.5°C/MIN 7.5°C/MIN

25°C/MIN

1°C/MIN 2.5°C/MIN 7.5°C/MIN

25°C/MIN

BEARING'S COMPONENT, HEAT TREATMENT METHOD THEREOF, HEAT TREATMENT APPARATUS, AND ROLLING BEARING

BACKGROUND OF THE INVENTION

1. Field of the Invention

The present invention relates to a bearing's component, a heat treatment method thereof, a heat treatment apparatus, and a rolling bearing used for a portion where a long rolling contact fatigue life, an increased anti-crack strength, and a reduced long-term dimensional variation are required, and specifically, to a bearing's component, a heat treatment method thereof, a heat treatment apparatus, and a rolling bearing used for a speed reducer, a drive pinion, a bearing for a transmission and the like.

2. Description of the Background Art

To increase bearing's components in life, a heat treatment is performed. Specifically, for example, in quenching the components they are heated in an ambient RX gas with ammonium gas further introduced therein for carbonitriding their surface layer portion (see Japanese Patent Laying-Open Nos. 8-4774 and 11-101247). This carbonitriding process can generate retained austenite in a microstructure to provide an increased rolling contact fatigue life.

As the above-mentioned carbonitriding process is a diffusion process, it requires a high temperature maintained for a long period of time. As such, increased anti-crack strength is hardly obtained. Furthermore, as more austenite is retained, long-term dimensional variation rate increases, which is also a problem in this carbonitriding process.

Under rolling contact fatigue, an increased life can be ensured, an enhanced anti-crack strength can be provided and an increased long-term dimensional variation rate can be avoided by relying on designing a steel alloy. Relying on designing the alloy, however, increases source material cost disadvantageously.

Future bearing's components will be used in environments exerting large loads at high temperatures. Therefore, they will be required to be operable under larger loads at higher temperatures than conventional. As such, there is a demand for a bearing's component having a longer life under rolling contact fatigue, larger strength and higher dimensional stability.

SUMMARY OF THE INVENTION

It is an object of the present invention to provide a bearing's component, a heat treatment method thereof, a heat treatment apparatus and a rolling bearing having a longer life under rolling contact fatigue, an increased anti-crack strength, and a reduced long-term dimensional variation rate.

A heat treatment method of a bearing's component according to the present invention is a heat treatment method of a bearing's component, wherein the bearing's component is carbonitrided at a carbonitriding temperature higher than an $A_1$ transformation point of steel for the bearing's component and then cooled to a temperature lower than the $A_1$ transformation point, and subsequently, using a heat treatment apparatus that successively moves and heats each individual bearing's component, reheated to a range of quenching temperature of no less than the $A_1$ transformation point and less than the carbonitriding temperature to be quenched.

With such a method, as the bearing's component is carbonitrided and thereafter cooled to a temperature of less than the $A_1$ transformation point before it is finally quenched, a fine austenite grain size can be obtained. Specifically, when bearing's components are heated for low-temperature quenching of the second time, individual bearing's components are successively moved while heated, and thereafter, successively quenched from the one fully heated. Thus, both of the temperature raising rate and cooling rate can be increased. As such, fine grains of austenite with uniform size can be obtained. Additionally, the quenching cooling rate higher than a prescribed quenching cooling rate can be attained, and prescribed mechanical properties such as durability are ensured. Thus, highly remarkable improvements in characteristics can be attained as compared to a heat treatment of batch scheme, in which heating and quenching are carried out for each bucket containing a large number of bearing's components.

As used herein, the austenite grain refers to an austenite grain that is obtained from the trace of the austenite grain boundary before quenching that is found as the austenite grain boundary after quenching.

Generally, an attempt to obtain very fine austenite grains tends to result in mixed grains of fine grains and coarse grains. This phenomenon can be explained thermodynamically from the increase in the interfacial energy of the austenite grain boundary. When the austenite grains result in mixed grains, the mechanical properties thereof are determined by the coarse grains. Thus, even though fine grains are obtained in most areas, not much improvements in mechanical properties can be expected.

Using the above-discussed method to avoid mixed grains and to obtain fine austenite grains, Charpy impact value, fracture toughness, anti-crack strength, rolling contact fatigue life and the like can be improved. Here, the structure formed with substantially uniform grains and not with mixed grains are referred to as uniform grains or a uniform grain structure. Distinction between uniform grains and mixed grains will be described later.

In addition to the achievement of uniform and fine grains, for example, by cooling to a temperature at which austenite transforms, austenite grain boundary in carbonitriding can be unrelated to that in final quenching. The austenite grain boundary in carbonitriding contains areas where carbide and/or nitride are precipitated along the grain boundary. As such, if they remain in the austenite grain boundary in quenching, in such areas the carbide and/or nitride remain along the austenite grain boundary. Such carbide and/or nitride along the austenite grain boundary often result in a blade-like edge, which increases the degree of stress concentration and tends to become a starting point of crack under rolling contact fatigue. According to the heat treatment method of the present invention, in carbonitriding, carbide and/or nitride are precipitated in the austenite grain boundary at that stage. However, the austenite grain boundary of austenite that has been transformed and reheated to be austenized is normally unrelated to that in carbonitriding. As such, carbide and/or nitride generated in carbonitriding tends to have a thick and rounded edge for decreasing (carbide/matrix) interface. Accordingly, such carbide and/or nitride may contribute to improvements in hardwearing properties, deformation resistance under high temperatures and the like, while they are less likely to become a starting point of crack.

As used herein, steel for a bearing's component refers to steel generally used for a bearing's component, and normally it is steel to which a heat treatment such as quenching is applied and used.

In the heat treatment method of a bearing's component according to the present invention, the range of quenching temperature in reheating may be a temperature range of 790° C. to 830° C.

With such a method, the bearing's component is reheated to a temperature hardly allowing an austenite grain to be grown before quenched. Fine austenite grain size can thus be achieved.

The bearing's component according to the present invention may be subjected to any of the heat treatment method of a bearing's component described above, such that the grain size number of an austenite grain may exceed 10.

By making grains to have fine grain size number exceeding 10 (Japanese Industrial Standard) and to be uniform, not only rolling contact fatigue strength but also Charpy impact value, fracture toughness, compression strength and the like may be improved. Such effects may be attributed to, when the bearing's component is carbonitrided and cooled to austenite transformation progressing or completing temperature, not only fine grain size of austenite but also to the change in edge shape of carbide and/or nitride to be a shape other than a blade-like shape, which is attained by austenite grain boundary leaving carbide and/or nitride in quenching.

The bearing's component according to the present invention may be a bearing's component formed with steel for a bearing's component, and may include a carbonitrided layer. In a microstructure of either a quenching structure or a quenching-tempering structure, the grain size number of austenite crystal grain may exceed 10.

With such a configuration, while long rolling contact fatigue life is attained, improved Charpy impact values fracture toughness, compression strength and the like may be ensured.

The steel for a bearing's component according to the present invention may contain, in an area except for a carbonitrided surface layer, carbon by 0.6-1.2 wt %, silicon by 0.15-1.1 wt %, and manganese by 0.3-1.5 wt %.

In the configuration above, when carbon exceeds 1.2 wt %, cold workability is impaired due to high hardness even with spheroidizing of carbides. As such, sufficient amount of cold working and working accuracy cannot be attained when performing cold working. Additionally, steel tends to result in an excess-carburizing structure in carbonitriding, which may degrade anti-crack strength disadvantageously. On the other hand, when carbon is contained less than 0.6 wt %, a long period may be required for ensuring necessary surface hardness and retained austenite amount, or required internal hardness may hardly be attained in quenching after reheating.

Si content is determined to be 0.15-1.1 wt % since Si is capable of increasing resistance to temper softening to ensure resistance against heat, and improving rolling contact fatigue life characteristics under contaminated lubrication. When silicon is contained less than 0.15 wt %, rolling contact fatigue life characteristics under contaminated lubrication is not improved. On the other hand, when it is contained more than 1.1 wt %, hardness after normalizing will become excessively high and thus cold-workability is impaired.

Mn is effective in ensuring quenching hardenability of a carbonitrided layer and a core portion. When Mn content is less than 0.3 wt %, sufficient quenching hardenability cannot be attained and the core portion cannot attain sufficient strength. On the other hand, when Mn content exceeds 1.5 wt %, hardenability will be excessive and hardness after normalizing will become higher and thus cold-workability is impaired.

The steel for said bearing's component according to the present invention may further contain chromium by at most 2.0 wt %.

As above, by further containing chromium by at most 2.0 wt %, in the surface layer portion, carbide and/or nitride of chromium can be precipitated to facilitate improvements in hardness of the surface layer portion. Cr content is determined to be at most 2.0 wt %, since Cr content exceeding 2.0 wt % may significantly degrade cold workability, while not much contributing to improvements in hardness of the surface layer portion.

The above-mentioned austenite crystal grains may be formed with uniform grains.

By forming with uniform grains, the effect of fine austenite grains is ensured.

The bearing's component according to the present invention may be at least one of a race and a rolling element in a rolling bearing.

With such a configuration, the race and/or rolling element having an excellent rolling contact fatigue life and higher anti-crack strength can be obtained.

The rolling bearing according to the present invention may include any of the bearing's components described above.

With such a configuration, the rolling bearing having excellent durability against rolling contact fatigue and higher anti-crack strength can be obtained.

A heat treatment apparatus according to the present invention is an apparatus used for the above-discussed heat treatment method, and includes a carrier portion endlessly carrying the bearing's component from a front side to a rear side successively; a body portion positioned between the front side and the rear side and having heating means for reheating the carried bearing's component to a quenching temperature range that is less than the carbonitriding temperature; and a cooling medium container containing a cooling medium for quenching the bearing's components output from the carrier portion.

In the above-mentioned heat treatment apparatus, as the bearing's component is placed on the carrier portion individually, it can be in contact with a furnace atmosphere heated by heating means such as a radiant tube, a heater, a gas burner or the like with large surface area. As such, heating rate is increased and mixed grains may not be generated, as compared to a heat treatment of batch scheme, in which heating is carried out for each bucket containing a large number of bearing's components. In quenching also, the bearing's component is individually immersed in the cooling medium placed at the rear side through, for example, a guide such as a slide and then quenched. Thus, quenching can be carried out at an increased cooling rate again as compared to the heat treatment of batch scheme, in which quenching is carried out for each bucket containing a large number of bearing's components. Additionally, as the process is directly and successively carried out from the end of heating to quenching without requiring manpower, disadvantages such as a prolonged time from heating to quenching resulting in insufficient quenching and the like can be avoided.

As a result, for a large number of products, mechanical properties such as hardness can uniformly be improved without product variations, thus durability and the like can be increased. As such, reliability of the products can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B each show a microstructure of a bearing's component, more specifically, an austenite grain, wherein FIG. 5A is of a bearing's component according to and example of the present invention, and FIG. 5B is of a conventional bearing's component.

FIGS. 7A to 7D each show a microstructure of a bearing's component, more specifically, an austenite grain, wherein FIG. 7A is of temperature raising rate of 1° C./min, FIG. 7B is of temperature raising rate of 2.5° C./min, FIG. 7C is of temperature raising rate of 7.5° C./min, and FIG. 7D is of temperature raising rate of 25° C./min.

FIGS. 9A and 9B are schematic views of a rolling contact fatigue life tester, wherein FIG. 9A is a front view thereof and FIG. 9B is a side view thereof.

DESCRIPTION OF THE PREFERRED EMBODIMENTS

Figure 1:
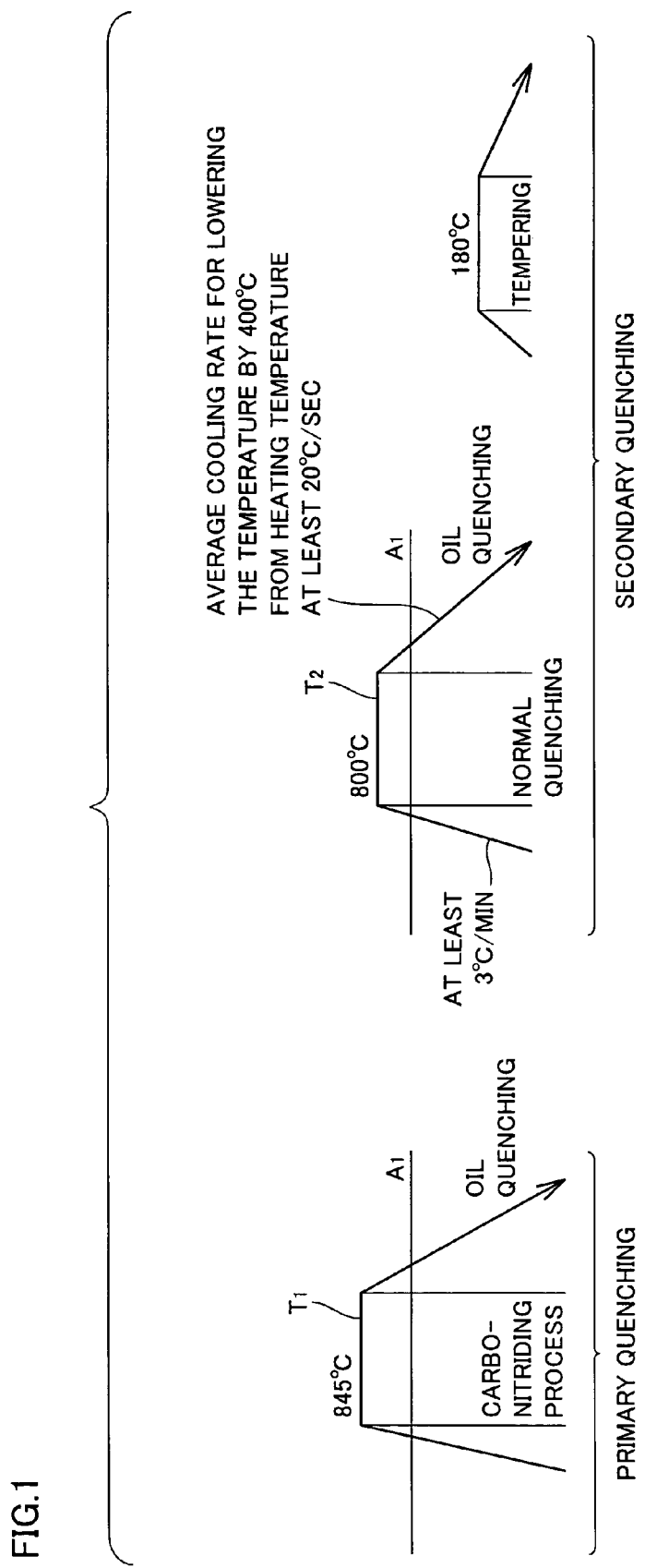
FIG. 1 is a diagram for illustrating a heat treatment method in accordance with an embodiment of the present invention.
Figure 2:
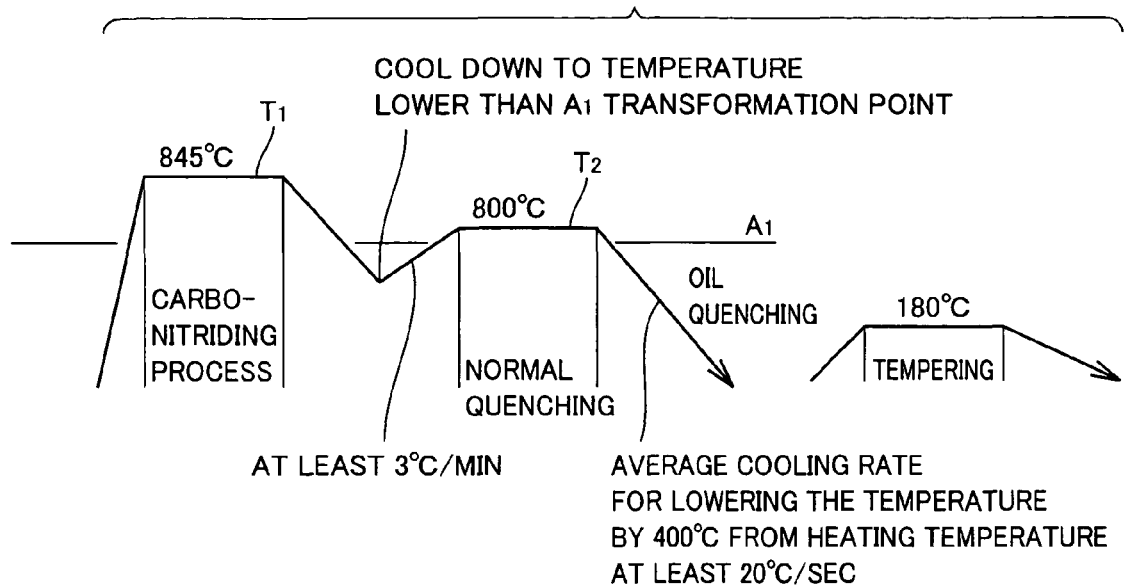
FIG. 2 is a diagram for illustrating a variation of a heat treatment method in accordance with an embodiment of the present invention.

In the following, an embodiment of the present invention will be described with reference to the drawings. FIGS. 1 and 2 show heat treatment method according to the embodiment of the present invention. FIG. 1 shows a heat treatment pattern according to which primary quenching and secondary quenching are carried out, and FIG. 2 shows a heat treatment pattern according to which a material is cooled to a temperature lower than the $A_1$ transformation point in a quenching process and thereafter heated again to be finally quenched. In these figures, at temperature $T_1$, carbon, nitrogen and the like are diffused in a steel matrix of a bearing's component and carbon is sufficiently included in the steel. Thereafter, at temperature $T_2$ in the figures, the bearing's component is reheated to a temperature lower than temperature $T_1$, from which the steel is subjected to oil quenching.

The following two points should be noted in FIGS. 1 and 2: (1) the temperature raising rate in heating to temperature $T_2$ is set to be at least 3° C./min at a depth of 2 mm from the surface of the bearing's component, and (2) in quenching from temperature $T_2$, the average cooling rate for lowering the temperature by 400° C. from the heating temperature at a depth of 2 mm from the surface of a bearing's component is set to be at least 20° C./sec, or quench severity (cooling power) of the cooling medium in quenching is set to be at least 0.1 cm$^{-1}$. By (1), fine austenite grains without mixed grains can be obtained, and by (2), hardness that is sufficient to ensure durability and the like can be obtained. Additionally, it is also important for obtaining appropriate amount of retained austenite.

Figure 3:
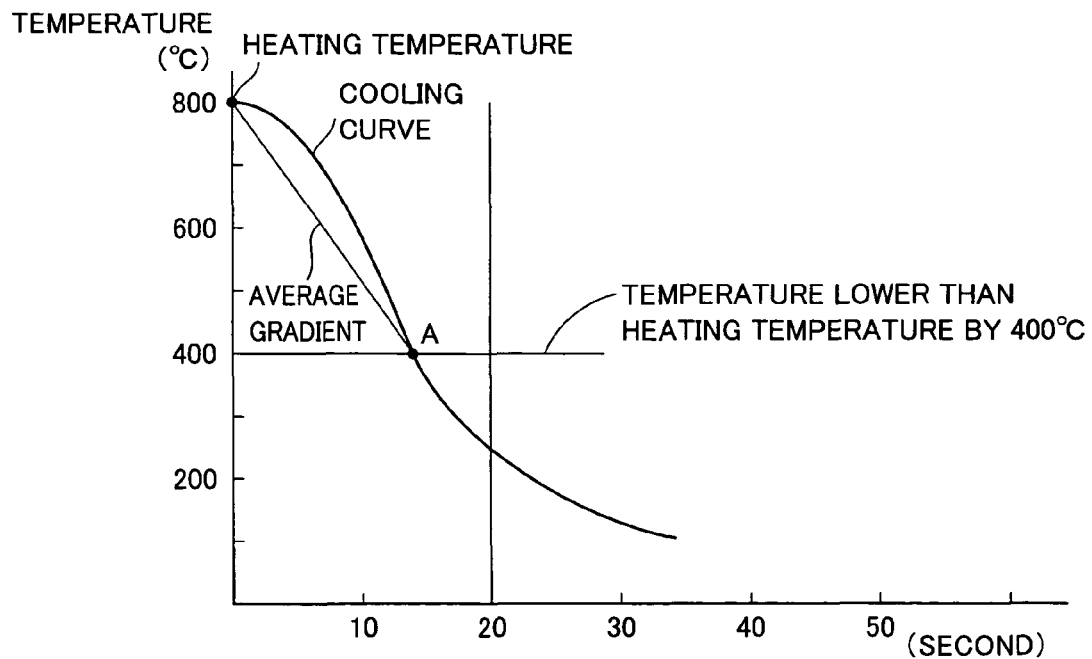
FIG. 3 is a diagram for illustrating an average cooling rate in an embodiment of the present invention.

FIG. 3 illustrates the above-mentioned average cooling rate. FIG. 3 shows the case where heating temperature $T_2$ is 800° C. The temperature raising rate is an average temperature raising rate from $A_1$ transformation point to temperature $T_2$. Additionally, given that the average cooling rate from heating temperature $T_2$ to the temperature lower than that by 400° C. is at least 20° C./sec, point A in FIG. 3 should only be at most 20 seconds on the axis of abscissas.

Compared with normal quenching, by which carbonitriding is done and immediately thereafter quenching is done once, the above-discussed heat treatment can provide enhanced crack strength and reduced long-term dimensional variation rate while carbonitriding the surface layer portion. According to the heat treatment method of the present invention as discussed above, a microstructure can be obtained that has austenite crystal grains of a grain size which is smaller than the conventional one by one half or more. The bearing's component subjected to the above-discussed heat treatment can have a long rolling contact fatigue life, an increased anti-crack strength, and a reduced long-term dimensional variation rate.

Figure 4:
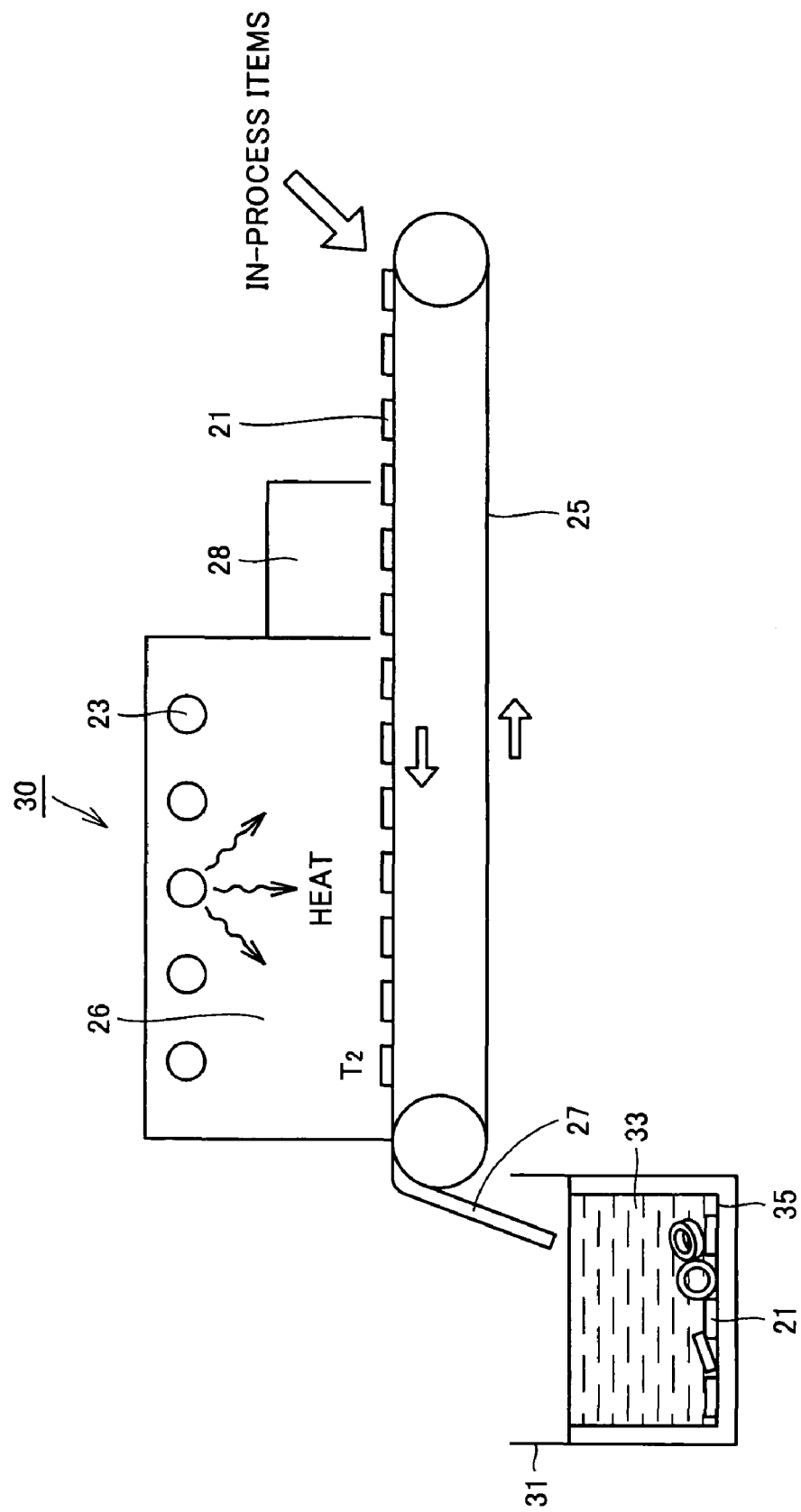
FIG. 4 illustrates an exemplary heat treatment apparatus used in a heat treatment method according to an embodiment of the present invention.

FIG. 4 shows a heat treatment apparatus 30 heating the bearing's components having finished carbonitriding to temperature $T_2$. The heat treatment apparatus is provided with an oil container 31 containing oil 33 for oil quenching at the rear side, and includes a quenching guide 27 for immersing bearing's components 21 in the oil container. Bearing's components 21 are placed on a carrier member 25 continuously and endlessly rotating from the front side, and then carried to a body portion 26 passing through preheating portion 28 and the like. In body portion 26, heating means such as a radiant tube 23 and the like is placed to heat bearing's components 21. The heating means may be a heater, a gas burner and the like. The furnace atmosphere is preferably a non-oxidizing atmosphere, but it is not necessary to be the non-oxidizing atmosphere.

The volume and the like of the furnace body may be set to ensure the above-discussed temperature raising rate. As the individual bearing's components are moved while heated, the temperature raising rate can be increased as compared to batch scheme, in which quenching is carried out for each bucket containing a large number of products. The bearing's components may reach the rear side of the furnace body when they are uniformly heated. The bearing's components uniformly heated to $T_2$ are dropped into oil container 31 through quenching guide 27 individually and successively. Bearing's components 21 are accommodated in a basket 35 placed in the oil container, and thus taken out altogether. It is not necessary to use oil for quenching, and various cooling medium can be used. Any cooling medium can be employed, such as water containing surfactant, or simply water, as long as it meets quench severity of at least 0.1 cm$^{-1}$. The cooling rate can also be increased by using the above-discussed heat treatment apparatus as compared to the batch scheme quenching where a large number of products are contained in a bucket and quenched, since the bearing's components can successively be quenched from the one finished with reheating.

It is possible to attain the above-discussed temperature raising rate with the batch scheme. However, when heat treatment is performed for numerous bearing's components contained in a bucket, some products may not attain sufficient cooling rate depending on their position. The above-discussed heat treatment apparatus performing successive processing can produce a large number of products of uniform quality. Preferably, the above-discussed oil container or cooling medium container includes a cooling apparatus or the like in order to keep the temperature of the cooling medium in a prescribed range, such that the temperature does not exceed a prescribed upper limit, in accordance with the condition where bearing's components are successively and individually immersed and quenched. Further, when the cooling apparatus is not included, a prescribed volume should be set such that the cooling medium does not exceed a prescribed upper limit temperature while target bearing's components are finishing with the above-discussed successive reheating and quenching.

EXAMPLE

Figure 5A:
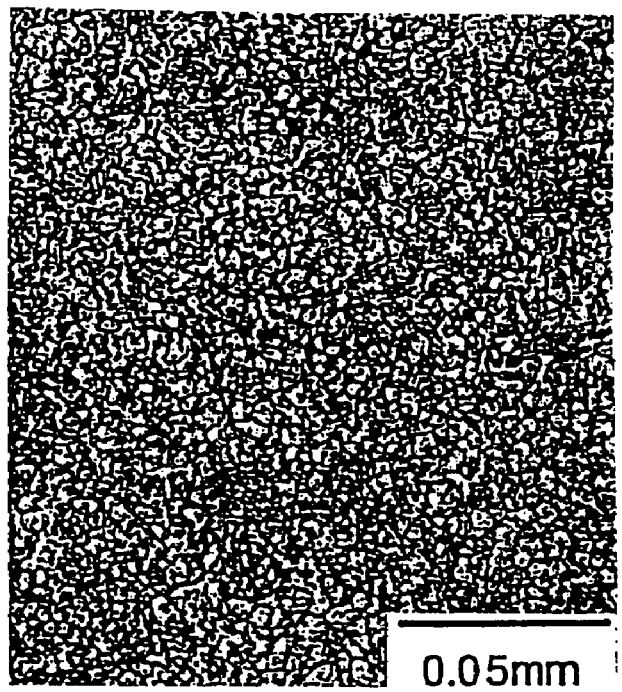
Figure 5B:
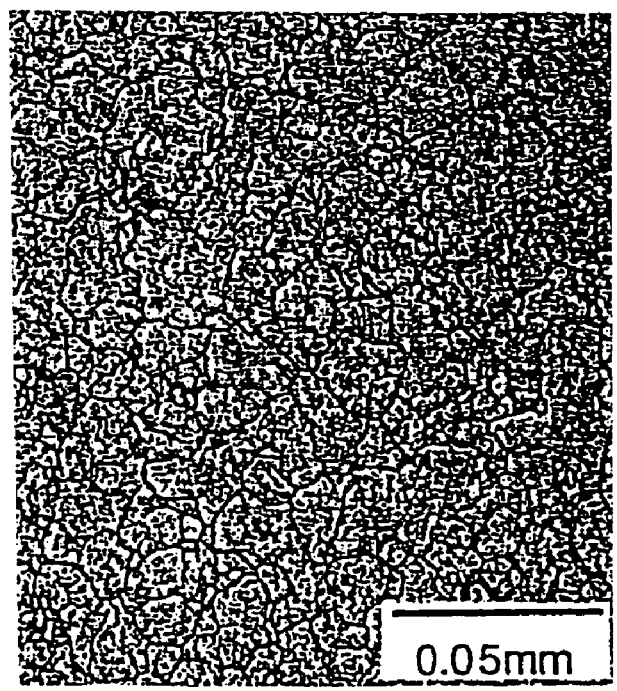
Figure 6A:
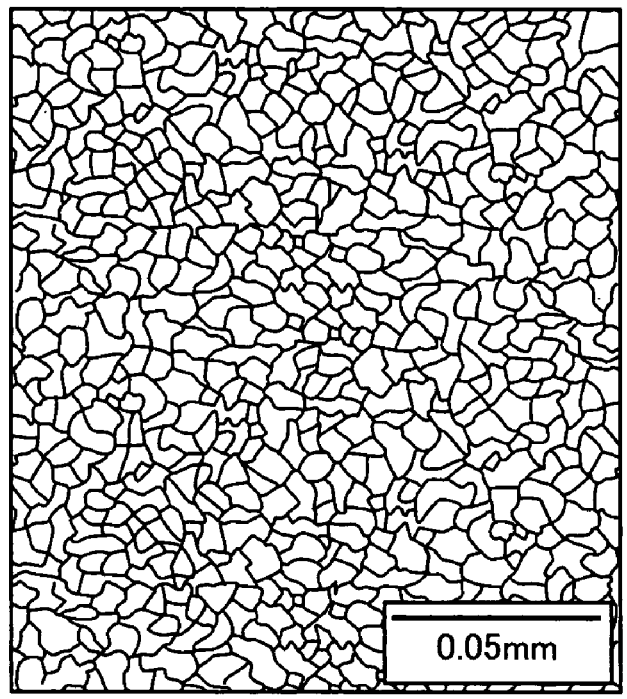
FIG. 6A is a drawing of the prior austenite grain boundary shown in FIG. 5A.
Figure 6B:
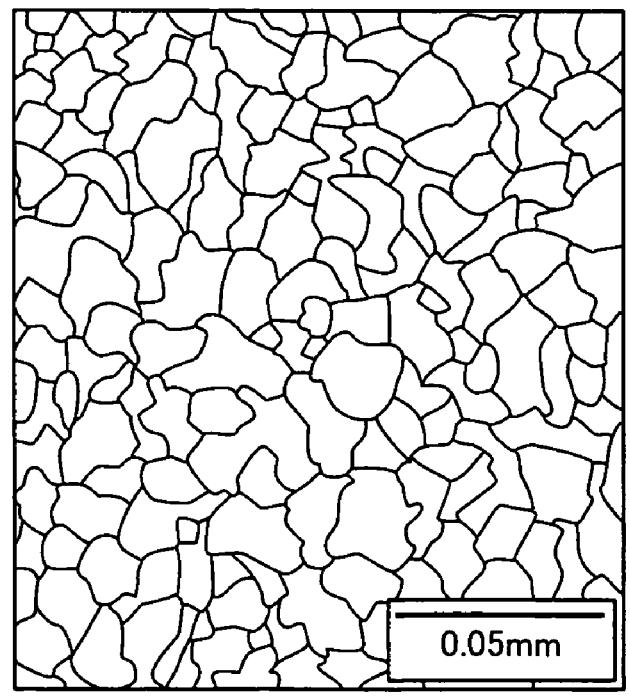
FIG. 6B is a drawing of the prior austenite grain boundary shown in FIG. 5I.
Figure 7A:
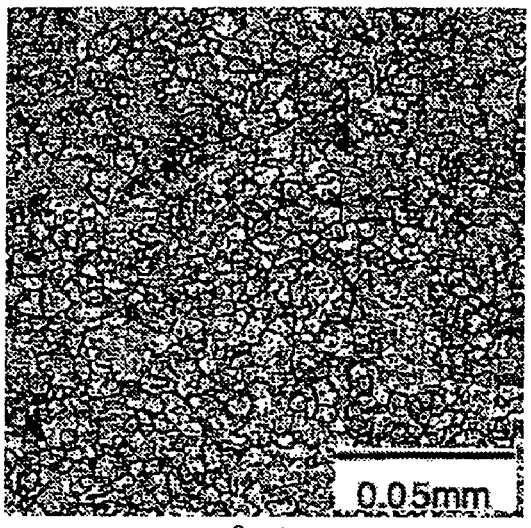
Figure 7B:
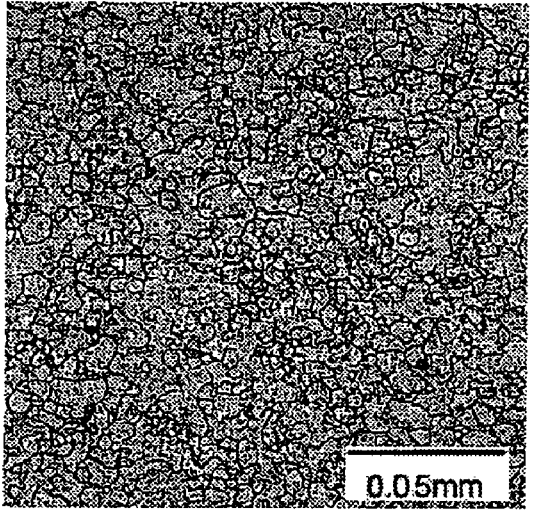
Figure 7C:
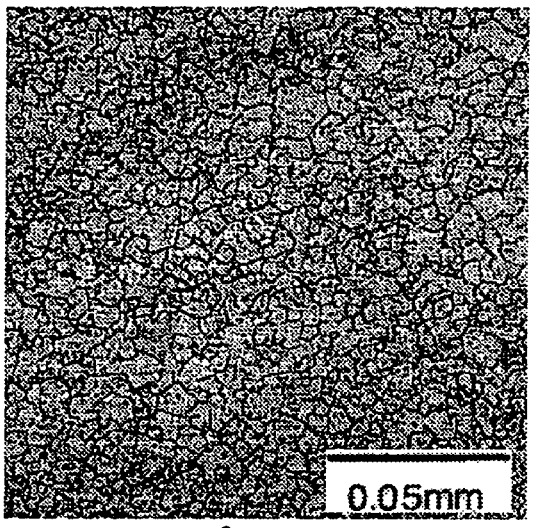
Figure 7D:
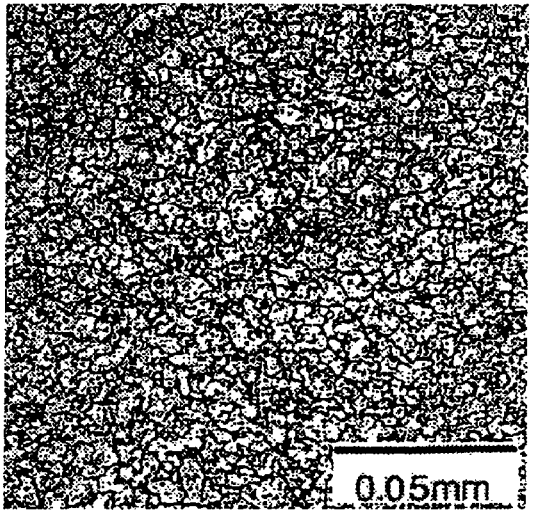

FIG. 5A shows austenite crystal grain size of a bearing steel applied with the heat treatment pattern shown in FIG. 1. For comparison, FIG. 5B shows austenite crystal grain size of a bearing steel which has undergone the conventional heat treatment. JIS-SUJ2 (1.0 wt % of C—0.25 wt % of Si—0.4 wt % of Mn—1.5 wt % of Cr) of steel material was used in both of the methods. FIGS. 6A and 6B diagrammatically show the crystal grain sizes of austenite that are shown in FIGS. 5A and 5B. In the structures with the crystal grain sizes of austenite, the grain size of the conventional austenite is 10 which is a grain size number defined by JIS while that of the present invention through the heat treatment method thereof is 12 and thus fine grains are seen. Further, the average grain size in FIG. 5A is 5.6 μm measured by the intercept method.

Next, the effect of the temperature raising rate to heating temperature $T_2$ exerted to generation of mixed grains of austenite crystal grains is described. JIS-SUJ2 as sample was heated to 800° C. in accordance with the heat pattern shown in FIG. 1 and with varied temperature raising rate to temperature $T_2$. Thereafter, oil quenching was performed and the austenite grains were examined. The results are shown in FIGS. 7A-7D. FIGS. 8A-8D diagrammatically represents FIGS. 7A-7D.

Figure 8A:
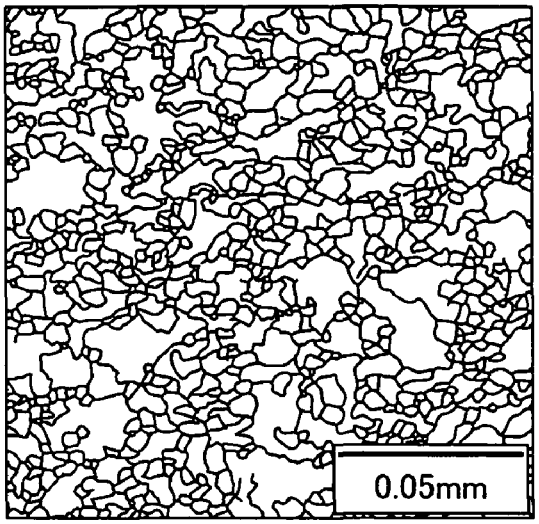
FIGS. 8A to 8D are drawings of austenite grain boundary, wherein FIG. 8A corresponds to FIG. 7A, FIG. 8B corresponds to FIG. 7B, FIG. 8C corresponds to FIG. 7C, and FIG. 8D corresponds to FIG. 7D.
Figure 8B:
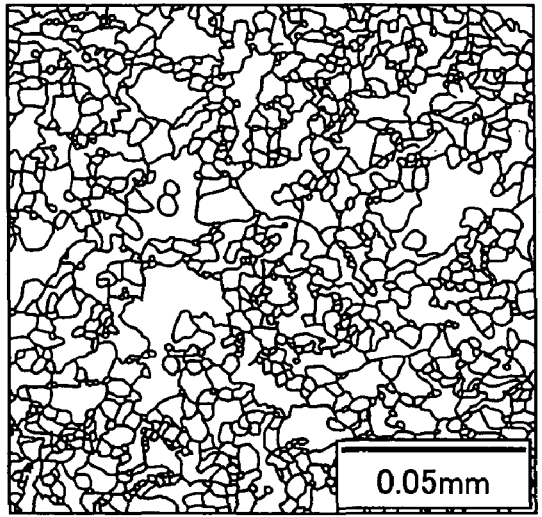

FIGS. 8A and 8B show austenite grains when heated at temperature raising rates of 1° C./min and 2.5° C./min, respectively. It can be seen that coarse austenite grains are grown among fine austenite grains. The coarse austenite grains are grown by merging with fine austenite grains, and while they are coarse grains, their grain boundaries show curved continuous portions with small curvatures, as if grain boundaries of fine grains are remained.

Figure 8C:
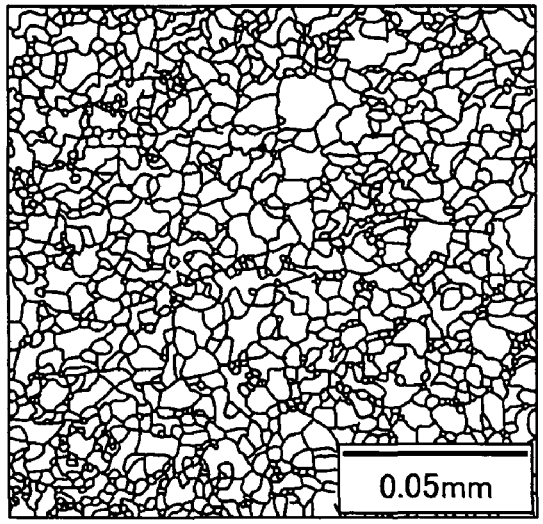
Figure 8D:
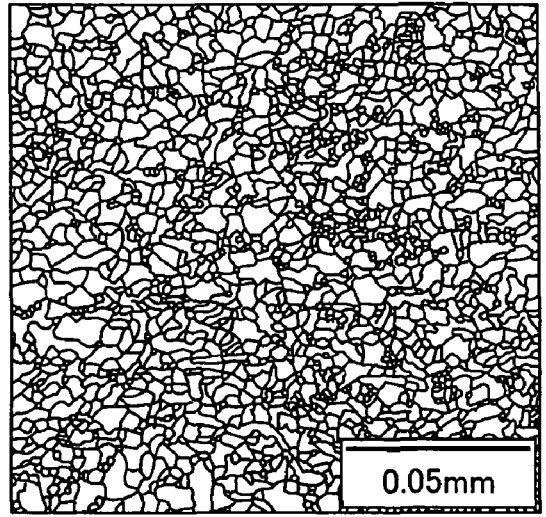

In FIGS. 8C and 8D, the difference between larger grain sizes and smaller grain sizes among the mixed grains becomes less significant, and the structure can be regarded as uniform grains. The term mixed grain structure is defined by JIS G0551. As described above, very fine austenite grains can be obtained when the above-discussed temperature raising rate is set to at least 3° C./min. When the temperature raising rate is lower than 3° C./min, very large coarse grains are grown. As a result, mechanical properties such as durability are degraded. Such limitation in the temperature raising rate is significantly effective in avoiding the mixed grain structure.

Next, using the same steel material, the relationship between quench severity (cooling power) of oil and quench hardness was examined. The samples of steel material are JIS-SUJ2, each of which are ring-shaped and have an outer diameter of 60 mm, and a length of 10 mm, while their inner diameter, and hence, the thickness is different. Their thickness is varied in a range of 2 mm-8 mm. As to the heat treatment pattern, the pattern of FIG. 1 was employed, and quench severity was changed by using different cooling oils in quenching from temperature $T_2$. As oil with low quench severity, a hot oil was employed, and as oil with high quench severity, a cold oil was employed. A semi-hot oil was employed as an intermediate oil between them. Quench severity was varied in a range of 0.1-0.14 cm$^{-1}$. After the steel was quenched, it was tempered at 180° C. and the hardness thereof was measured. The hardness is average Vickers hardness (HV) at a depth of 0.2 mm from the surface of circumferential length central portion of each ring sample. The number tested was 3. The results are shown in Table 1.

TABLE 1

| Ring thickness of samples | Quench severity of oil (1/cm) | | |
|---|---|---|---|
| (mm) | 0.1 | 0.13 | 0.14 |
| 2 | HV770 | HV780 | HV790 |
| 4 | HV750 | HV770 | HV780 |
| 6 | HV650 | HV770 | HV770 |
| 8 | HV600 | HV750 | HV760 |

Table 1 shows that if quench severity is at least 0.1 cm$^{-1}$, HV750 can be attained with thickness of 4 mm, and that even with thickness of 8 mm, HV600 can be attained. Accordingly, sufficient quenching for ensuring mechanical properties can be carried out when quench severity of at least 0.1 cm$^{-1}$ is maintained.

Next, On the following samples A, B and C, a series of tests was conducted. A material to be heat-treated that was employed commonly to samples A-C was JIS-SUJ2 (1.0 wt % of C—0.25 wt % of Si—0.4 wt % of Mn—1.5 wt % of Cr).

Sample A—comparative example: normal quenching only (without carbonitriding)

Sample B—comparative example: quenching directly after carbonitriding (conventional carbonitriding and quenching)

Sample C—example of the present invention: a bearing steel processed following the heat treatment pattern shown in FIG. 1.

(1) Rolling Contact Fatigue Life

Figure 9A:
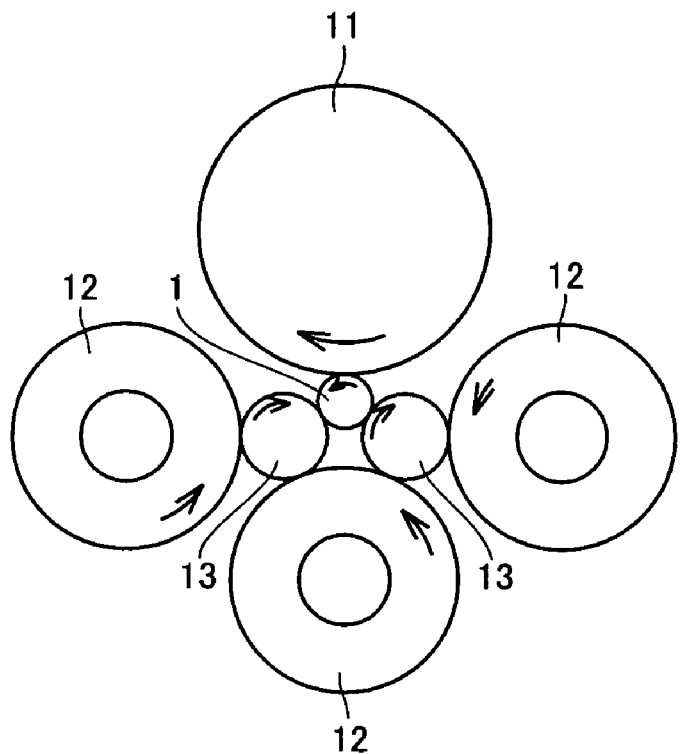
Figure 9B:
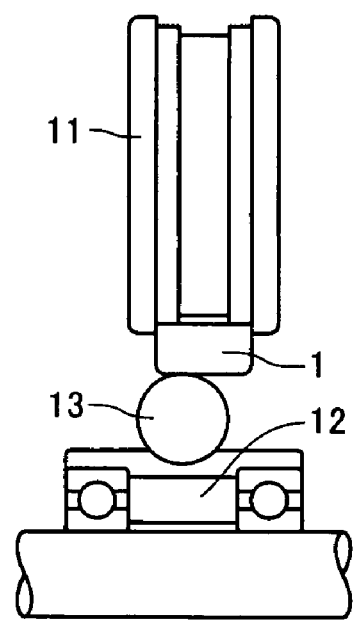

Test conditions and the test device for the rolling contact fatigue life test are as shown in Table 2 and FIGS. 9A and 9B. The test was conducted by supporting a cylindrical test piece 1 having a diameter of 12 mm and a length of 22 mm between a steel ball 13 contacting to a guide wheel 12 and a driving wheel 11, and rotating driving wheel 11 in this state, and measuring the resulting life (L10 life). Results of the rolling contact fatigue life test are shown in Table 3.

TABLE 2

| | |
|---|---|
| Test piece | φ 12 × L22 cylindrical test piece |
| Number of tested pieces | 10 |
| Counterpart steel ball | ¾" (19.05 mm) |
| Contact surface pressure | 5.88 Gpa |
| Load speed | 46240 cpm |
| Lubricating oil | Turbine VG68 - forced circulation lubrication |

TABLE 3

| | Life (load count) | | |
|---|---|---|---|
| Sample | $L_{10}$ (×10$^4$ times) | $L_{10}$ (×10$^4$ times) | Relative $L_{10}$ |
| A | 8000 | 18000 | 1.0 |
| B | 15000 | 27000 | 1.9 |
| C | 40000 | 60000 | 5.0 |

According to Table 3, carbonitrided sample B of comparative example has an $L_{10}$ life (the life where one out often test pieces is damaged) that is 1.6 times as long as that of sample A of comparative example having undergone normal quenching only, and thus it is seen that the effect of extending the life is obtained through the carbonitriding process. In contrast, sample C of the present invention has a longer life which is 2.7 times as long as that of sample B and 5.0 times as long as that of sample A. It is considered that this improvement is obtained mainly from the fine microstructure.

(2) Charpy Impact Test

A Charpy impact test was conducted by using a U-notch test piece defined by JIS Z 2242. Test results are shown in Table 4.

TABLE 4

| Sample | Charpy impact value (J/cm$^2$) | Relative impact value |
|---|---|---|
| A | 5.5 | 1.0 |
| B | 5.0 | 0.9 |
| C | 8.2 | 1.5 |

While carbonitrided sample B (comparative example) did not achieve a Charpy impact value higher that that of sample A (comparative example) having undergone only normal quenching, Sample C achieved the value approximately 1.5 times as high as that of Sample A.

(3) Static Fracture Toughness Test

Figure 10:
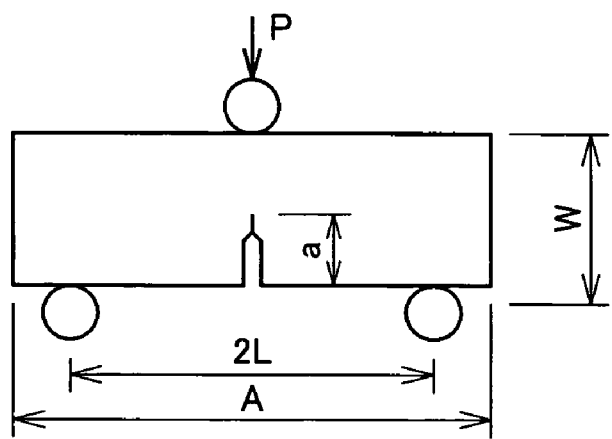
FIG. 10 shows a sample used in a static fracture toughness test.

The test piece shown in FIG. 10 was used for the static fracture toughness test. In this test piece, a pre-crack of approximately 1 mm was made, thereafter a static load by three-point bending was added, and then a fracture load P was determined. Using the following formula (I), a fracture toughness value ($K_{Ic}$ value) was calculated, where B is the thickness of a sample. Results of the test are shown in Table 5.

$$K_{Ic} = (PL\sqrt{a}/BW^2)\{5.8 - 9.2(a/W) + 43.6(a/W)^2 - 75.3(a/W)^3 + 77.5(a/W)^4\} \quad (I)$$

TABLE 5

| Sample | Number tested | $K_{1C}$ (MPa$\sqrt{m}$) | Relative $K_{1C}$ |
|---|---|---|---|
| A | 3 | 16.3 | 1.0 |
| B | 3 | 16.1 | 1.0 |
| C | 3 | 18.9 | 1.2 |

As the pre-crack had a depth greater than the depth of the carbonitrided layer and thus the same results were obtained for samples A and B of comparative examples, while sample C of example of the present invention achieved a value approximately 1.2 times as high as those of comparative examples.

(4) Static-Pressure Fracture-Strength Test

Figure 11:
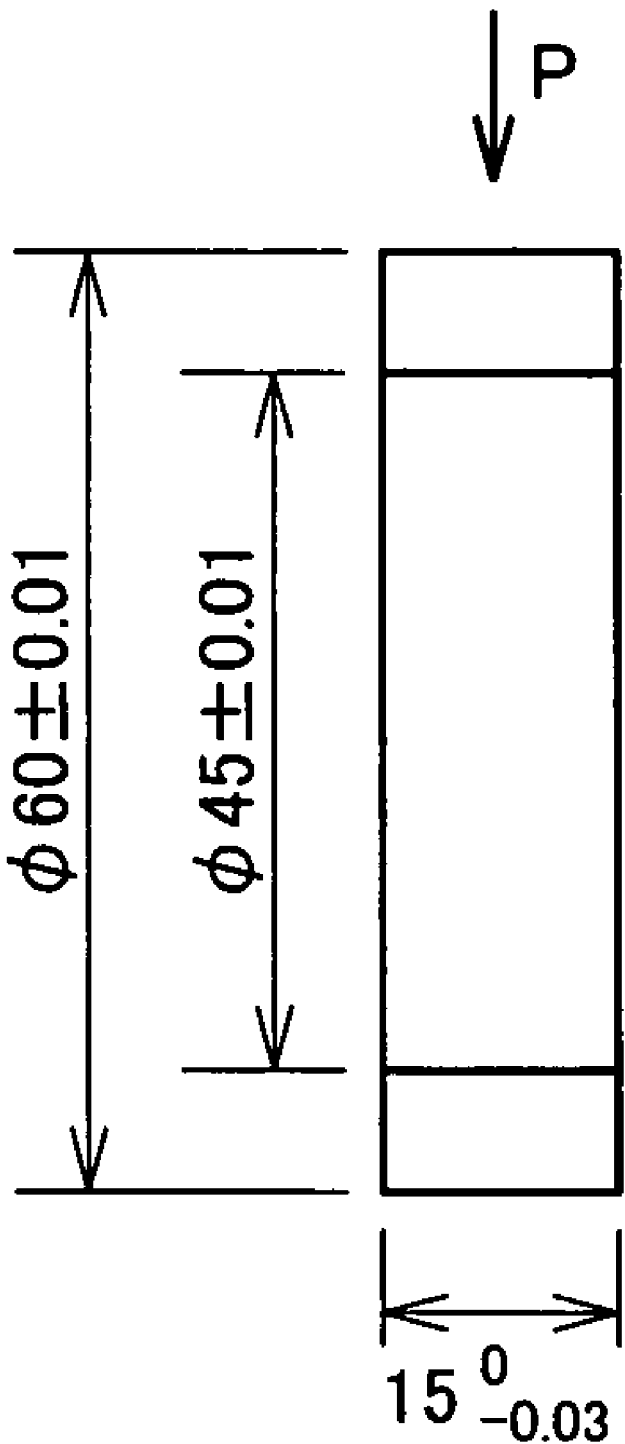
FIG. 11 shows a sample used in a static pressure fracture strength test.

A static-pressure fracture-strength test piece as shown in FIG. 11 was used. A load was exerted in direction P in the figure to conduct a static-pressure fracture-strength test. Test results are shown in Table 6.

TABLE 6

| Sample | Number tested | Static fracture strength (kgf) | Relative static fracture strength |
|---|---|---|---|
| A | 3 | 4100 | 1.0 |
| B | 3 | 3410 | 0.8 |
| C | 3 | 3900 | 0.95 |

Carbonitrided sample B has a value of a static-pressure fracture-strength slightly smaller than that of sample A having undergone normal quenching. In contrast, sample C of an example of the present invention has a static-pressure fracture-strength value considerably higher than that of sample B, and thus achieves the substantially same level as sample A.

(5) Rate of Long-Term Dimensional Variation

Table 7 shows the rate of long-term dimensional variation measured under the conditions of 130° C. of holding temperature and 500 hours of holding time, together with the surface hardness and the amount of retained austenite (at 0.1 mm depth).

TABLE 7

| Sample | Number tested | Surface hardness (HRC) | Retained γ (%) | Rate of dimensional change (×10$^{-5}$) | Relative rate of dimensional change*$^)$ |
|---|---|---|---|---|---|
| A | 3 | 62.0 | 9.0 | 18 | 1.0 |
| B | 3 | 62.8 | 28.0 | 35 | 1.9 |
| C | 3 | 63.2 | 11.3 | 22 | 1.2 |

*smaller is superior

As compared with the rate of dimensional variation of sample B having a large amount of retained austenite, sample C of an example of the present invention has reduced amount of retained austenite by more than half, and thus its rate of dimensional variation is largely suppressed.

(6) Life Test Under Contaminated Lubricant Condition

Ball bearing 6206 was used to evaluate the rolling contact fatigue life under a contaminated lubricant condition having a predetermined amount of normal contaminants mixed therein. Test conditions are shown in Table 8 and test results are shown in Table 9.

TABLE 8

| | |
|---|---|
| Load | Fr = 6.86 kN |
| Contact surface pressure | Pmax = 3.2 Gpa |
| Rate of rotation | 2000 rpm |
| Lubricant | Turbine 56 - oil bath lubrication |
| Amount of contaminant | 0.4 g/1000 cc |
| Contaminant | Grain size: 100-180 μm, hardness: Hv800 |

TABLE 9

| Sample | $L_{10}$ life (h) | Relative $L_{10}$ |
|---|---|---|
| A | 20.0 | 1.0 |
| B | 50.2 | 2.5 |
| C | 45.8 | 2.3 |

Sample B having undergone conventional carbonitriding has a lifetime which is approximately 2.5 times as long as that of sample A, and sample C of the present invention has a lifetime which is approximately 2.3 times as long as that of sample A. While sample C of the present invention has a smaller amount of retained austenite than that of sample B of the comparative example, sample C has a substantially equivalent long lifetime because of influences of entering nitrogen and the fine microstructure.

It is accordingly seen from the above-discussed results that, sample C of the present invention, namely the bearing's component produced by the heat treatment method of the present invention can simultaneously achieve three goals that have been difficult to achieve by the conventional carbonitriding: extension of the rolling contact fatigue life, improvement in crack strength and reduction of the rate of long-term dimensional variation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bearing's component formed with steel for a bearing's component, comprising a carbonitrided layer,
wherein in a microstructure of a quenching-tempering structure, the grain size number of austenite crystal grain exceeds 10,
said steel for said bearing's component, in an area except for a carbonitrided surface layer, is JIS SUJ2, and
said austenite crystal grain is formed with uniform grain size.

2. The bearing's component according to claim 1, wherein said bearing's component is at least one of a race and a rolling element in a rolling bearing.

3. A rolling bearing including said bearing's component according to claim 1.

4. A bearing's component, subjected to a heat treatment method wherein said bearing's component is carbonitrided at a carbonitriding temperature higher than an $A_1$ transformation point of steel for said bearing's component and then cooled to a temperature lower than the $A_1$ transformation point, and subsequently, using a heat treatment apparatus that successively moves and heats each individual bearing's component, reheated to a range of quenching temperature ($T_2$) of no less than said $A_1$ transformation point and less than said carbonitriding temperature to be quenched,
wherein grain size number of an austenite crystal grain exceeds 10,
said steel for said bearing's component, in an area except for a carbonitrided surface layer, is JIS SUJ2, and
the temperature raising rate in heating to temperature $T_2$ (quenching temperature) is set to be at least 3° C./min at a depth of 2 mm from the surface of the bearing's component.

5. The bearing's component according to claim 4, wherein said range of quenching temperature is 790° C. to 830° C.

6. The bearing's component according to claim 4, wherein said austenite crystal grain is formed with uniform grain size.

7. The bearing's component according to claim 4, wherein said bearing's component is at least one of a race and a rolling element in a rolling bearing.

8. A rolling bearing including said bearing's component according to claim 4.

* * * * *